(12) United States Patent
Mizutaki et al.

(10) Patent No.: US 11,591,490 B2
(45) Date of Patent: *Feb. 28, 2023

(54) AQUEOUS INK JET INK COMPOSITION AND INK JET RECORDING METHOD

(71) Applicant: Seiko Epson Corporation, Tokyo (JP)

(72) Inventors: Yusuke Mizutaki, Shiojiri (JP); Atsushi Muto, Shiojiri (JP)

(73) Assignee: SEIKO EPSON CORPORATION

( * ) Notice: Subject to any disclaimer, the term of this patent is extended or adjusted under 35 U.S.C. 154(b) by 630 days.

This patent is subject to a terminal disclaimer.

(21) Appl. No.: 16/593,092

(22) Filed: Oct. 4, 2019

(65) Prior Publication Data

US 2020/0109301 A1 Apr. 9, 2020

(30) Foreign Application Priority Data

Oct. 5, 2018 (JP) .............................. JP2018-189856

(51) Int. Cl.
*C09D 11/324* (2014.01)
*B41J 2/16* (2006.01)
*C09D 11/40* (2014.01)
*B41J 2/21* (2006.01)

(52) U.S. Cl.
CPC .......... *C09D 11/324* (2013.01); *B41J 2/1626* (2013.01); *B41J 2/21* (2013.01); *C09D 11/40* (2013.01); *B41J 2202/01* (2013.01)

(58) Field of Classification Search
CPC ... C09D 11/324; C09D 11/106; C09D 11/107; C09D 11/322; C09D 11/38; C09D 11/40; B41J 2/21; B41J 2/1626; B41J 2202/01
See application file for complete search history.

(56) References Cited

U.S. PATENT DOCUMENTS

| | | | |
|---|---|---|---|
| 9,708,500 B2 * | 7/2017 | Ito | ........................... C09D 11/30 |
| 10,752,796 B2 * | 8/2020 | Seguchi | ............... C09D 11/033 |
| 10,787,585 B2 * | 9/2020 | Ito | ........................ C09D 11/324 |
| 2003/0079647 A1 | 5/2003 | Kaneko et al. | |
| 2006/0098050 A1 | 5/2006 | Terui | |
| 2007/0003715 A1 | 1/2007 | Tsubaki et al. | |
| 2010/0165019 A1 | 7/2010 | Koike et al. | |
| 2011/0187770 A1 | 8/2011 | Aoyama et al. | |
| 2017/0246893 A1 | 8/2017 | Muto et al. | |
| 2017/0369723 A1 | 12/2017 | Mizutaki et al. | |
| 2018/0086067 A1 | 3/2018 | Mizutani | |

FOREIGN PATENT DOCUMENTS

| | | |
|---|---|---|
| CN | 107880649 A | 4/2018 |
| JP | 2002-179958 A | 6/2002 |
| JP | 2002-338864 A | 11/2002 |
| JP | 2005-264080 A | 9/2005 |

(Continued)

*Primary Examiner* — An H Do

(74) *Attorney, Agent, or Firm* — Harness, Dickey & Pierce, P.L.C.

(57) ABSTRACT

An aqueous ink jet ink composition is for use in an ink jet recording method. The method includes ejecting ink from an ink jet head including nozzles. The nozzles are configured such that a shape of a side wall surface is a scalloped shape in which a scallop width S1 and a notch depth S2 satisfy S1/S2≥4. The aqueous ink jet ink composition includes a pigment and a solvent that contains a specific compound.

15 Claims, 2 Drawing Sheets

(56) References Cited

FOREIGN PATENT DOCUMENTS

| | | |
|---|---|---|
| JP | 2006-130868 A | 5/2006 |
| JP | 2008-150507 A | 7/2008 |
| JP | 2011-162687 A | 8/2011 |
| JP | 2018-002778 A | 1/2018 |
| JP | 2018-051955 A | 4/2018 |
| JP | 2018-127521 A | 8/2018 |
| WO | 2008/075715 A1 | 6/2008 |

* cited by examiner

AQUEOUS INK JET INK COMPOSITION AND INK JET RECORDING METHOD

The present application is based on, and claims priority from, JP Application Serial Number 2018-189856, filed Oct. 5, 2018, the disclosure of which is hereby incorporated by reference herein in its entirety.

BACKGROUND

1. Technical Field

The present disclosure relates to an aqueous ink jet ink composition and an ink jet recording method.

2. Related Art

A typical ink jet recording apparatus includes an ejection head including nozzles for ejecting ink, a driving unit for causing ink to be ejected from the nozzles, and a control unit for controlling the driving unit in accordance with data. The nozzles of the ejection head are formed by dry etching a silicon substrate to realize a high array density and an increase in the number of nozzles. It is known that a shape of the side wall surface of the nozzles formed in such a manner is a corrugated shape called a "scalloped shape", which is similar to the shape seen on the surface of the shell of a scallop.

JP-A-2018-002778 discloses a water-based ink composition for use in an ink jet recording apparatus including an ink jet head that includes nozzles, the nozzles being configured such that a shape of the side wall surface of the nozzles is a scalloped shape. According to the disclosure of JP-A-2018-002778, the water-based ink composition has a viscosity at 20° C., a yield value at 20° C., and a yield value at 20° C. when 25% of water is evaporated, each of which is within a specified range, and thus the water-based ink composition has excellent continuous printing stability even in high-temperature environments.

However, for water-based ink compositions, such as that described in JP-A-2018-002778, that are used in an ink jet recording apparatus including an ink jet head that includes nozzles, which are configured such that a shape of the side wall surface of the nozzles is a scalloped shape, there is a need for further improvement in continuous printing stability and intermittent printability.

SUMMARY

The present inventors diligently performed studies to solve the problems described above. As a result, it was found that the problems described above can be solved by an aqueous ink jet ink composition including a pigment and a solvent that contains a specific compound.

Specifically, the present disclosure is as follows.

According to the present disclosure, an aqueous ink jet ink composition is for use in an ink jet recording method. The method includes ejecting ink from an ink jet head including nozzles. The nozzles are configured such that a shape of a side wall surface is a scalloped shape in which a scallop width S1 and a notch depth S2 satisfy S1/S2≥4. The aqueous ink jet ink composition includes a pigment and a solvent that contains a compound represented by general formula (1) below.

$$R_1\text{—O—}R_2\text{—OH} \quad (1)$$

In formula (1), $R_1$ represents a hydrogen atom, a methyl group, or an ethyl group, and $R_2$ represents a divalent saturated hydrocarbon group having 5 or fewer carbon atoms or a group represented by general formula (2) below.

$$R_3\text{—O—}R_4 \quad (2)$$

In formula (2), $R_3$ and $R_4$ each independently represent a divalent saturated hydrocarbon group having 2 or 3 carbon atoms.

A content of the compound represented by general formula (1) may be from 2 to 16 mass % relative to a total amount of the aqueous ink jet ink composition.

The compound represented by general formula (1) may be at least one selected from the group consisting of ethylene glycol, diethylene glycol, propylene glycol, dipropylene glycol, and propylene glycol monomethyl ether.

The solvent may include a penetrating solvent, and the penetrating solvent may be at least one selected from the group consisting of 1,2-alkanediols having 6 or more carbon atoms and alkylene glycol monobutyl ethers.

A content of the penetrating solvent may be from 2.0 to 8.0 mass % relative to the total amount of the aqueous ink jet ink composition.

A mass ratio of the content of the penetrating solvent to the content of the compound represented by general formula (1) may be from 0.1 to 1.0.

The aqueous ink jet ink composition may further include resin particles.

The resin particles may be styrene-acrylic-based resin particles containing a methacrylic monomer as a constituent component.

The resin particles may be styrene-acrylic-based resin particles containing an α-methylstyrene monomer as a constituent component.

The solvent may further include glycerol, and a content of the glycerol may be less than or equal to 10 mass % relative to the total amount of the aqueous ink jet ink composition.

A content of the pigment may be from 0.5 to 10 mass % relative to the total amount of the aqueous ink jet ink composition.

The solvent may include a pyrrolidone-based solvent.

The pigment may have a volume average particle diameter of from 50 to 150 nm.

The nozzles may be nozzles formed by performing an etching process and an etching side wall protection process alternately and repeatedly several times.

According to the present disclosure, an ink jet recording method includes an ejection step of ejecting an aqueous ink jet ink composition of the present disclosure from an ink jet head. The ink jet head includes nozzles, and the nozzles are configured such that a shape of a side wall surface is a scalloped shape in which a scallop width S1 and a notch depth S2 satisfy S1/S2≥4.

DESCRIPTION OF EXEMPLARY EMBODIMENTS

Figure 1:
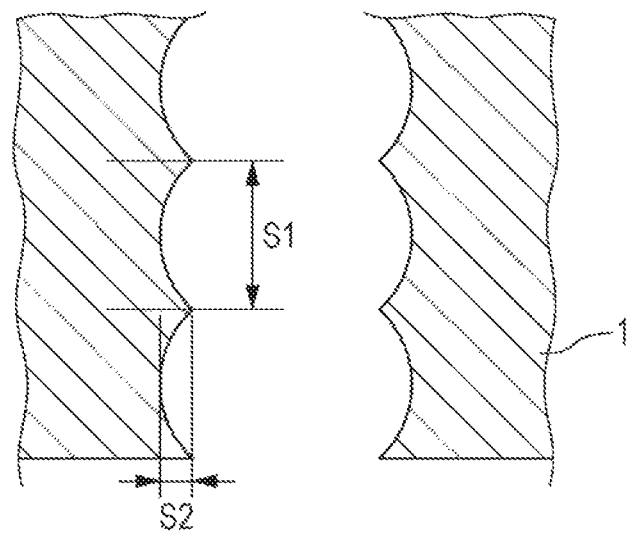
FIG. 1 is a cross-sectional view illustrating in detail a shape of a portion of a nozzle.

An embodiment of the present disclosure (hereinafter referred to as "present embodiment") will be described in detail below. However, the present disclosure is not limited to the present embodiment, and various modifications may be made thereto without departing from the scope of the disclosure.

In this specification, the term "ejection reliability" refers to a property of having excellent intermittent printability and/or high-temperature continuous printability. In this specification, the term "intermittent printability" refers to a property of ensuring stable ejection even when the time interval from the time at which ejection is stopped to the time at which the next ejection is performed is long. In this specification, the term "high-temperature continuous printability" refers to a property of ensuring stable ejection even when printing is performed continuously at a relatively high temperature. For example, the property is a property of ensuring stable ejection even when printing is performed for 7 to 9 hours continuously at a high temperature of 30 to 50° C.

Aqueous Ink Jet Ink Composition

An aqueous ink jet ink composition of the present embodiment is for use in an ink jet recording apparatus that ejects ink from an ink jet head that includes nozzles, the nozzles being configured such that a shape of a side wall surface is a scalloped shape in which a scallop width S1 and a notch depth S2 satisfy a relationship of S1/S2≥4. The aqueous ink jet ink composition includes a pigment and a solvent that contains a compound represented by general formula (1) below. Hereinafter, the aqueous ink jet ink composition is simply referred to as an "aqueous ink".

$$R_1\text{—}O\text{—}R_2\text{—}OH \quad (1)$$

In formula (1), $R_1$ represents a hydrogen atom, a methyl group, or an ethyl group, and $R_2$ represents a divalent saturated hydrocarbon group having 5 or fewer carbon atoms or a group represented by general formula (2) below.

$$R_3\text{—}O\text{—}R_4 \quad (2)$$

In formula (2), $R_3$ and $R_4$ each independently represent a divalent saturated hydrocarbon group having 2 or 3 carbon atoms.

To realize a high array density and an increase in the number of nozzles, the nozzles of the ejection head are configured such that the side wall surfaces have a scalloped shape. In the case in which the side wall surface has such a shape, a problem arises in that when pigment-containing aqueous ink is ejected, alignment degradation, that is, a so-called misalignment, tends to occur. Furthermore, in the case in which the side wall surface has a scalloped shape, because of the large surface area of the interiors of the nozzles, the aqueous ink dries in the interiors of the nozzles when the aqueous ink is ejected and the meniscus is drawn in, and the solids, which primarily include the pigment, adhere and accumulate in the interiors of the nozzles, which results in, for example, a deviation in the ejection direction and a failure to eject the aqueous ink. The present inventors diligently performed studies to address the problems. As a result, the present inventors found that when an ether group- and hydroxyl group-containing compound having a relatively low molecular weight is used as the solvent, the occurrence of a deviation in the ejection direction can be reduced and misfiring of aqueous ink can be inhibited. One possible and non-limiting reason for this is that such a solvent coats the pigment, thereby enhancing the dispersion stability of the pigment and inhibiting thickening of the ink that may occur when the ink dries. The ink jet ink composition is an ink composition that is used for recording by being ejected from an ink jet head. The aqueous ink is ink including at least water, which is a principal solvent component of the ink.

Pigment

The aqueous ink includes a pigment. Since the aqueous ink includes a pigment, the ink has excellent light resistance and color development. Examples of the pigment include inorganic pigments and organic pigments.

Examples of the inorganic pigment include carbons, such as carbon blacks, examples of which include furnace black, lamp black, acetylene black, and channel black; iron oxides; and titanium oxides.

Examples of the organic pigment include azo pigments, such as insoluble azo pigments, condensed azo pigments, azo lakes, and chelate azo pigments; polycyclic pigments, such as phthalocyanine pigments, perinone pigments, anthraquinone pigments, quinacridone pigments, dioxane pigments, thioindigo pigments, isoindolinone pigments, and quinophthalone pigments; dye chelates; dye lakes; nitro pigments; nitroso pigments; aniline black; and daylight fluorescent pigments.

Examples of carbon blacks that may be used for a black ink include No. 2300, No. 900, MCF88, No. 33, No. 40, No. 45, No. 52, MA7, MA8, MA100, and No. 2200B (all manufactured by Mitsubishi Chemical Corporation); Raven 5750, Raven 5250, Raven 5000, Raven 3500, Raven 1255, and Raven 700 (all manufactured by Columbia Carbon Inc.); Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all manufactured by Cabot Corporation); and Color Black FW1, Color Black FW2, Color Black FW2V, Color Black FW18, Color Black FW200, Color Black S 150, Color Black S 160, Color Black S 170, Printex 35, Printex U, Printex V, Printex 140U, Special Black 6, Special Black 5, Special Black 4A, and Special Black 4 (all manufactured by Degussa).

Examples of pigments that may be used for a white ink include C.I. Pigment Whites 6, 18, and 21.

Examples of pigments that may be used for a yellow ink include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of pigments that may be used for a magenta ink include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 242, and 245 and C.I. Pigment Violets 19, 23, 32, 33, 36, 38, 43, and 50.

Examples of pigments that may be used for a cyan ink include C.I. Pigment Blues 1, 2, 3, 15, 15:1, 15:2, 15:3, 15:34, 15:4, 16, 18, 22, 25, 60, 65, and 66 and C.I. Vat Blues 4 and 60.

Examples of pigments other than those for magenta, cyan, and yellow inks include C.I. Pigment Greens 7, 10, and 36, C.I. Pigment Browns 3, 5, 25, and 26, and C.I. Pigment Oranges 1, 2, 5, 7, 13, 14, 15, 16, 24, 34, 36, 38, 40, 43, and 63.

It is preferable that the pigment have a volume average particle diameter of from 50 to 150 nm. When the pigment has a volume average particle diameter of greater than or equal to 50 nm, the aqueous ink tends to have even better high-temperature continuous printability. When the pigment has a volume average particle diameter of less than or equal to 150 nm, the aqueous ink tends to have even better pigment non-settling characteristics. Accordingly, when the pigment has a volume average particle diameter of from 50 to 150 nm, there is a tendency for excellent high-temperature continuous printability and non-settling characteristics to be achieved in a balanced manner. From a similar standpoint, the volume average particle diameter of the pigment is more preferably greater than or equal to 70 nm and even more preferably greater than or equal to 80 nm, and, is more preferably less than or equal to 140 nm and even more preferably less than or equal to 130 nm. The volume average particle diameter of the pigment can be determined by using the method described in Examples, which will be discussed later.

It is preferable that the content of the pigment be from 0.5 to 10 mass % relative to the total amount of the aqueous ink. When the content of the pigment is greater than or equal to 0.5 mass %, the aqueous ink tends to have even better color development. When the content of the pigment is less than or equal to 10 mass %, the aqueous ink tends to have even better intermittent printability. Accordingly, when the content of the pigment is from 0.5 to 10 mass % relative to the total amount of the aqueous ink, there is a tendency for excellent color development and intermittent printability to be achieved in a balanced manner. From a similar standpoint, the content of the pigment is more preferably greater than or equal to 1.0 mass % and even more preferably greater than or equal to 3.0 mass %, and, is more preferably less than or equal to 8.0 mass % and even more preferably less than or equal to 7.0 mass %. Furthermore, the content of the pigment is particularly preferably less than or equal to 6.0 mass %, more particularly preferably less than or equal to 5.0 mass %, even more particularly preferably less than or equal to 4.5 mass %, and still even more particularly preferably less than or equal to 4.0 mass %, because particularly excellent intermittent printability, for example, is achieved. On the other hand, the content of the pigment is particularly preferably greater than or equal to 4.0 mass % and more particularly preferably greater than or equal to 5.0 mass %, because particularly excellent image quality, for example, can be obtained. Examples of pigments that may be used include pigments that are dispersed with a dispersant, such as a resin dispersant; pigments that are coated with a resin by phase inversion emulsification or the like; and self-dispersible pigments.

Solvent

The solvent includes a compound represented by general formula (1) below. Hereinafter, the compound represented by general formula (1) below may be simply referred to as a "specific compound". Since the solvent includes the specific compound, the aqueous ink has excellent ejection reliability. The compound represented by general formula (1) is a type of solvent.

$$R_1-O-R_2-OH \quad (1)$$

In formula (1), $R_1$ represents a hydrogen atom, a methyl group, or an ethyl group, and $R_2$ represents a divalent saturated hydrocarbon group having 5 or fewer carbon atoms or a group represented by general formula (2) below.

$$R_3-O-R_4 \quad (2)$$

In formula (2), $R_3$ and $R_4$ each independently represent a divalent saturated hydrocarbon group having 2 or 3 carbon atoms.

It is preferable that $R_1$ of formula (1) be a hydrogen atom or a methyl group from the standpoint of achieving even better ejection reliability.

Examples of the divalent saturated hydrocarbon group having 5 or fewer carbon atoms include linear alkanediyl groups, branched alkanediyl groups, and divalent alicyclic saturated hydrocarbon groups. It is preferable that the divalent saturated hydrocarbon group having 5 or fewer carbon atoms be a linear alkanediyl group or a branched alkanediyl group from the standpoint of providing effects and advantages of the present disclosure more effectively and reliably.

Examples of the linear alkanediyl group include a methylene group, a 1,2-ethylene group, a 1,3-propylene group (trimethylene group), a 1,4-butylene group (tetramethylene group), and a 1,5-pentylene group (pentamethylene group). Examples of the branched alkanediyl group include a 1,1-ethylene group, a 1,1-propylene group, a 1,2-propylene group, a 2,2-propylene group, a 1,4-pentylene group, a 2,4-pentylene group, a 2-methylpropane-1,3-diyl group, a 2-methylpropane-1,2-diyl group, and a 2-methylbutane-1,4-diyl group.

The divalent saturated hydrocarbon group having 5 or fewer carbon atoms is preferably a divalent saturated hydrocarbon group having from 2 to 4 carbon atoms and more preferably a divalent saturated hydrocarbon group having 2 or 3 carbon atoms, from the standpoint of achieving even better ejection reliability.

With regard to formula (2), examples of the divalent saturated hydrocarbon group having 2 or 3 carbon atoms include linear alkanediyl groups having 2 or 3 carbon atoms and branched alkanediyl groups having 2 or 3 carbon atoms. Examples of the linear alkanediyl group having 2 or carbon atoms include a 1,2-ethylene group and a 1,3-propylene group. Examples of the branched alkanediyl group having 2 or 3 carbon atoms include a 1,1-ethylene group, a 1,1-propylene group, a 1,2-propylene group, and a 2,2-propylene group.

With regard to formula (2), $R_3$ and $R_4$ are each preferably an ethylene group or a propylene group, more preferably a propylene group, and even more preferably a 1,2-propylene group, from the standpoint of achieving even better ejection reliability.

It is preferable that the specific compound be one of the following: with regard to formula (1), (i) a compound in which $R_1$ is a hydrogen atom, a methyl group, or an ethyl group, and $R_2$ is a divalent saturated hydrocarbon group having 5 or fewer carbon atoms; and (ii) a compound in which $R_1$ is a hydrogen atom, and $R_2$ is a group represented by general formula (2). When the specific compound is such a compound, the aqueous ink tends to have even better ejection reliability.

It is preferable that the specific compound be one of the following: with regard to formula (1), (iii) a compound in which $R_1$ is a hydrogen atom or a methyl group, and $R_2$ is a divalent saturated hydrocarbon group having 3 or fewer carbon atoms; and (iv) a compound in which $R_1$ is a hydrogen atom, $R_2$ is a group represented by general formula (2), and $R_3$ and $R_4$ are each an ethylene group or each a propylene group. When the specific compound is such a compound, the aqueous ink tends to have even better high-temperature continuous printability.

Representative examples of the specific compound include ethylene glycol, propylene glycol, 1,4-butanediol, 1,5-pentanediol, ethylene glycol monomethyl ether, propylene glycol monomethyl ether, 1-methoxy butanol, ethylene glycol monoethyl ether, propylene glycol monoethyl ether, diethylene glycol, diethylene glycol monomethyl ether, diethylene glycol monoethyl ether, dipropylene glycol, and dipropylene glycol monomethyl ether.

In particular, it is preferable that the specific compound be at least one selected from the group consisting of ethylene glycol, diethylene glycol, propylene glycol, dipropylene glycol, and propylene glycol monomethyl ether. When the specific compound is such a compound, the aqueous ink tends to have even better high-temperature continuous printability.

The content of the specific compound is preferably from 1 to 20 mass % and more preferably from 2 to 16 mass %, relative to the total amount of the aqueous ink. When the content of the specific compound is greater than or equal to 1 mass %, the aqueous ink tends to have even better ejection reliability. When the content of the specific compound is less than or equal to 20 mass %, the aqueous ink tends to have even better abrasion resistance and ink storage stability. When the content of the specific compound is the content described above relative to the total amount of the aqueous ink, there is a tendency for excellent ejection reliability, abrasion resistance, and ink storage stability to be all achieved. From a similar standpoint, the content of the specific compound is more preferably greater than or equal to 4 mass % and even more preferably greater than or equal to 6 mass %, and, is more preferably less than or equal to 15 mass % and even more preferably less than or equal to 10 mass %.

It is preferable that the solvent contain at least one compound selected from the group consisting of 1,2-alkanediols having 6 or more carbon atoms and alkylene glycol monobutyl ethers. Hereinafter, such a compound may be referred to as a "penetrating solvent" and particularly may be referred to as a "specific penetrating solvent". When the solvent includes a penetrating solvent, the aqueous ink tends to have even better ejection reliability. One possible and non-limiting reason for this is as follows. That is, the following is presumed. When the solvent includes a penetrating solvent, the aqueous ink exhibits even better wettability towards the side wall surfaces of the nozzles. As a result, when the meniscus is repeatedly drawn in, it is unlikely that air bubbles will remain on the side wall surfaces, which have a scalloped shape, and, therefore, the promotion of drying of the aqueous ink due to contact with air bubbles is reduced.

Examples of the 1,2-alkanediol having 6 or more carbon atoms include 1,2-alkanediols having from 6 to 10 carbon atoms, such as 1,2-hexanediol, 1,2-heptanediol, 1,2-octanediol, 5-methyl-1,2-hexanediol, 4-methyl-1,2-hexanediol, and 4,4-dimethyl-1,2-pentanediol.

Examples of the alkylene glycol monobutyl ether include dialkylene glycol monobutyl ethers and trialkylene glycol monobutyl ethers. Examples of the dialkylene glycol monobutyl ether include diethylene glycol monobutyl ether, and examples of the trialkylene glycol monobutyl ether include triethylene glycol monobutyl ether.

In particular, it is preferable that the penetrating solvent be a 1,2-alkanediol having 6 or more carbon atoms. With the use of such a compound, the aqueous ink tends to further inhibit filling failure that may occur in recording.

The content of the penetrating solvent is preferably from 1.0 to 8.0 mass % and more preferably from 2.0 to 8.0 mass %, relative to the total amount of the aqueous ink. When the content of the penetrating solvent is greater than or equal to 1.0 mass %, the aqueous ink tends to further inhibit filling failure that may occur in recording. When the content of the penetrating solvent is less than or equal to 8.0 mass %, the aqueous ink tends to have even better high-temperature continuous printability and ink storage stability. When the content of the penetrating solvent is within the above-mentioned ranges relative to the total amount of the aqueous ink, the aqueous ink tends to further inhibit filling failure that may occur in recording and tends to have even better high-temperature continuous printability and ink storage stability. From a similar standpoint, the content of the penetrating solvent is more preferably greater than or equal to 3.0 mass % and even more preferably greater than or equal to 4.5 mass %, and, is more preferably less than or equal to 7.5 mass % and even more preferably less than or equal to 6.0 mass %.

It is preferable that the mass ratio of the content of the penetrating solvent to the content of the specific compound be from 0.1 to 1.0. When the mass ratio is greater than or equal to 0.1, the aqueous ink tends to further inhibit filling failure that may occur in recording. When the mass ratio is less than or equal to 1.0, the aqueous ink tends to have even better high-temperature continuous printability and ink storage stability. When the mass ratio is from 0.1 to 1.0, the aqueous ink tends to further inhibit filling failure that may occur in recording and tends to have even better high-temperature continuous printability and ink storage stability. From a similar standpoint, the mass ratio is more preferably greater than or equal to 0.2 and even more preferably greater than or equal to 0.4, and, is more preferably less than or equal to 0.9 and even more preferably less than or equal to 0.6.

It is preferable that the solvent include a pyrrolidone-based solvent. When the solvent includes a pyrrolidone-based solvent, the aqueous ink tends to have even better high-temperature continuous printability and abrasion resistance.

Examples of the pyrrolidone-based solvent include 2-pyrrolidone, N-alkyl-2-pyrrolidone, and 1-alkyl-2-pyrrolidone. It is preferable that the pyrrolidone-based solvent be 2-pyrrolidone from the standpoint of providing effects and advantages of the present disclosure more effectively and reliably.

When a pyrrolidone-based solvent is included, the content of the pyrrolidone-based solvent is preferably from 0.5 to 10 mass %, more preferably from 0.7 to 7 mass %, even more preferably from 1 to 5 mass %, and particularly preferably from 1 to 2 mass %, relative to the total amount of the aqueous ink.

The solvent may include one or more additional solvents, in addition to the specific compound and the penetrating solvent. In particular, the additional solvent may be a solvent other than a pyrrolidone-based solvent. Examples of the additional solvent include polyols and glycol ethers. Examples of the polyol include alkane polyols having three or more hydroxyl groups, alkanediols, and products produced by condensation between hydroxyl groups of alkanediols. Examples of the glycol ether include monoethers and diethers produced by etherification of the above-mentioned alkanediols. It is to be noted that the additional solvent is a solvent other than the specific compound and the penetrating solvent described above. The additional solvent is preferably a polyol and more preferably an alkanediol. With the use of such a compound, the ink composition tends to have even better abrasion resistance.

Examples of the additional solvent include triethylene glycol, tetraethylene glycol, polyethylene glycol, 1,3-propanediol, tripropylene glycol, polypropylene glycol, poly(tetramethylene) glycol, hexamethylene glycol, tetramethylene glycol, neopentyl glycol, 1,2-butanediol, 1,3-butanediol, 1,4-butanediol, 1,2-pentanediol, 1,5-pentanediol, 1,6-hexanediol, 3-methyl-1,5-pentanediol, 1,2-cyclohexanediol, 1,4-cyclohexanediol, 1,4-cyclohexanedimethanol, 4,4-dihydroxyphenylpropane, 4,4-dihydroxyphenylmethane, glycerol, trimethylolethane, trimethylolpropane, 1,2,5-hexanetriol, 1,2,6-hexanetriol, pentaerythritol, trimethylol melamine, polyoxypropylene triol, dimethyl-1,3-pentanediol, diethyl-1,3-pentanediol, dipropyl-1,3-pentanediol, dibutyl-1,3-pentanediol, and 2-butyl-2-ethyl-1,3-propanediol. One of these is used alone or two or more of these are used in combination.

The content of the additional solvent is preferably from 1 to 25 mass %, more preferably from 2 to 20 mass %, and even more preferably from 5 to 15 mass %, relative to the total amount of the aqueous ink. Furthermore, it is also preferable that the content of the additional solvent, excluding a pyrrolidone-based solvent, be within the above-mentioned ranges.

The content of glycerol is preferably less than or equal to 20 mass %, more preferably less than or equal to 13 mass %, and even more preferably less than or equal to 11 mass %, relative to the total amount of the aqueous ink. When the content of glycerol is within the above-mentioned ranges, the aqueous ink tends to have even better intermittent printability and abrasion resistance. From a similar standpoint, the content of glycerol is preferably less than or equal to 10 mass %, more preferably less than or equal to 9.5 mass %, and even more preferably less than or equal to 9.0 mass %, relative to the total amount of the aqueous ink. It is preferable that glycerol be included as the additional solvent in the ink. The content of glycerol is preferably greater than or equal to 3 mass %, more preferably greater than or equal to 5 mass %, and even more preferably greater than or equal to 7 mass %. This is preferable because even better ejection reliability is achieved. Glycerol has a relatively high normal boiling point and provides excellent moisture retention for the ink. On the other hand, glycerol has a high viscosity, and therefore, when the ink dries on the scallop of the side wall of the nozzle, the ink tends to have increased viscosity. It is presumed that when the content of glycerol in the ink is within the above-mentioned ranges, ejection failure due to increased viscosity can be reduced. However, the reason is not limited to this.

Resin Particles

It is preferable that the aqueous ink include resin particles. When the aqueous ink includes resin particles, the aqueous ink tends to have even better ejection reliability and ink storage stability.

The resin particles may be self-dispersible resin particles including a hydrophilic component incorporated into the resin particles for stable dispersion in water. The resin particles may be resin particles that can be rendered water-dispersible with the use of an external emulsifier.

Examples of the resin particles include acrylic-based resin particles, urethane-based resin particles, polyester-based resin particles, fluorene-based resin particles, polyolefin-based resin particles, rosin-modified resin particles, terpene-based resin particles, polyamide-based resin particles, epoxy-based resin particles, vinyl chloride-based resin particles, vinyl chloride-vinyl acetate copolymer particles, and ethylene vinyl acetate-based resin particles. In particular, it is preferable that the resin particles be as follows. From the standpoint of achieving even better high-temperature continuous printability, it is preferable that the resin particles be acrylic-based resin particles, polyester-based resin particles, or urethane-based resin particles. From the standpoint of achieving even better ink storage stability, it is preferable that the resin particles be acrylic-based resin particles or urethane-based resin particles. From the standpoint of achieving even better high-temperature continuous printability and ink storage stability, it is preferable that the resin particles be acrylic-based resin particles.

The "acrylic-based resin" is a general term for polymers obtained by polymerizing a material including at least, as one component, an acrylic-based monomer, such as (meth) acrylic acid or a (meth)acrylic acid ester. Examples of the acrylic-based resin include resins produced from an acrylic-based monomer and copolymers of an acrylic-based monomer and a monomer other than an acrylic-based monomer. Examples of the acrylic-based monomer include acrylic monomers and methacrylic monomers. Examples of the copolymer include an acrylic-vinyl-based resin, which is a copolymer of an acrylic-based monomer and a vinyl-based monomer. The copolymer may be a styrene-acrylic-based resin, which is a copolymer of an acrylic-based monomer and a styrene monomer used as the vinyl-based monomer. Examples of the styrene monomer include styrene and styrene derivatives, such as α-methylstyrene. The styrene-acrylic-based resin in the styrene-acrylic-based resin particles may be in the form of any of the following: a random copolymer, a block copolymer, an alternating copolymer, and a graft copolymer.

From the standpoint of achieving even better high-temperature continuous printability and ink storage stability, it is preferable that the styrene-acrylic-based resin be a styrene-acrylic-based resin containing, as a constituent component, a methacrylic monomer. Examples of such styrene-acrylic-based resins include styrene-methacrylic acid copolymers and styrene-methacrylic acid-acrylic acid ester copolymers. Particles of these styrene-acrylic-based resins may be commercially available products or preparations prepared in accordance with a known method.

From the standpoint of achieving even better high-temperature continuous printability and ink storage stability, it is preferable that the styrene-acrylic-based resin be a styrene-acrylic-based resin containing, as a constituent component, an α-methylstyrene monomer. Examples of such styrene-acrylic-based resins include styrene-α-methylstyrene-acrylic acid copolymers and styrene-α-methylstyrene-acrylic acid-acrylic acid ester copolymers.

Examples of the urethane-based resin in the urethane-based resin particles include polyether-based polyurethane resins, polyester-based resins, and polycarbonate-based resins. The urethane-based resin particles may be commercially available products. Examples of commercially available products include TAKELAC (registered trademark) W-6061 (manufactured by Mitsui Chemicals, Inc.), TAKELAC (registered trademark) W-6021 (manufactured by Mitsui Chemicals, Inc.), and WBR-016U (manufactured by Taisei Fine Chemical Co., Ltd.).

The polyester-based resin particles may be commercially available products. Examples of commercially available products include Vylonal MD-1100 and Vylonal MD-1500 (manufactured by Toyobo Co., Ltd.).

The content of the resin particles is preferably from 0.3 to 3 mass %, more preferably from 0.5 to 2 mass %, and even more preferably from 0.7 to 1.5 mass %, relative to the total amount of the aqueous ink.

Surfactant

The aqueous ink may include a surfactant. Examples of the surfactant include acetylene glycol-based surfactants, fluorosurfactants, and silicone-based surfactants.

Examples of the acetylene glycol-based surfactant include Olfine 104 series and Olfine E series such as Olfine E1010 (products of Air Products and Chemicals Inc.) and Surfynol 465 and Surfynol 61 (products of Nissin Chemical Industry Co., Ltd.).

Examples of the fluorosurfactant include S-144 and S-145 (products of Asahi Glass Co., Ltd.); FC-170C, FC-430, and Fluorad FC4430 (products of Sumitomo 3M Ltd.); FSO, FSO-100, FSN, FSN-100, and FS-300 (manufactured by DuPont); and FT-250 and FT-251 (products of Neos Company Limited).

Examples of the silicone-based surfactant include BYK-306, BYK-307, BYK-333, BYK-341, BYK-345, BYK-346, BYK-347, BYK-348, and BYK-349 (products of BYK Japan KK) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (products of Shin-Etsu Chemical Co., Ltd.).

The content of the surfactant may be from 0.1 to 0.5 mass % relative to the total amount of the aqueous ink.

Neutralizing Agent

The aqueous ink may include a neutralizing agent for improved resin particle dispersion stability. Examples of the neutralizing agent include organic bases, such as N,N-dimethylethanolamine, N,N-diethylethanolamine, diethanolamine, triethanolamine, triisopropanolamine, trimethylamine, and triethylamine; and inorganic bases, such as sodium hydroxide, potassium hydroxide, and ammonia.

The content of the neutralizing agent may be from 1 to 3 mass % relative to the total amount of the aqueous ink.

Water

The aqueous ink may include water. The water is not particularly limited. Examples of the water include pure water such as ion-exchanged water, ultrafiltrated water, reverse osmosis water, and distilled water and ultrapure water. The aqueous ink is an ink in which at least water is a principal solvent component.

The content of the water is greater than or equal to 30 mass %, preferably greater than or equal to 50 mass %, more preferably greater than or equal to 60 mass %, and even more preferably greater than or equal to 70 mass %, relative to the total amount of the aqueous ink. The upper limit is not limited but is preferably less than or equal to 95 mass %, more preferably less than or equal to 90 mass %, and even more preferably less than or equal to 80 mass %.

The aqueous ink is for use in an ink jet apparatus including an ink jet head that includes nozzles, the nozzles being configured such that a shape of the side wall surface is a scalloped shape in which a scallop width $S1$ and a notch depth $S2$ satisfy a relationship of $S1/S2 \geq 4$. The aqueous ink is an ink for use in an ink jet recording method including performing recording by ejecting ink from the ink jet head. The "scalloped shape" refers to a shape such that the nozzle side wall has a continuous multi-step profile extending in a direction in which ink passes through the nozzle, as viewed in a cross section of the nozzle. An example of such an ink jet head is an ink jet recording head disclosed in JP-A-2018-002778, for example.

FIG. 1 is a cross-sectional view illustrating a cross-sectional shape of a portion of the side wall of a nozzle. In the case in which a shape of the side wall surface of a nozzle 1 is a scalloped shape, as illustrated in FIG. 1, a problem arises in that when pigment-containing aqueous ink is ejected, alignment degradation tends to occur. In cases in which a related-art aqueous ink is used, the aqueous ink dries in the interiors of the nozzles because of the large surface area of the interiors of the nozzles, when the aqueous ink is ejected and the meniscus is drawn in. Further, the solids, which primarily includes the pigment, adhere and accumulate in the interiors of the nozzles, which results in, for example, a deviation in the ejection direction and a failure to eject the aqueous ink. In contrast, in cases in which the aqueous ink of the present embodiment is used in an ink jet recording apparatus including an ink jet head that includes the nozzles described above, excellent ejection reliability is achieved because deviations in the ejection direction tend not to occur, and misfiring of the aqueous ink is inhibited.

The nozzles are formed as orifices provided in a nozzle-forming substrate and extending therethrough. It is sufficient that at least a portion of the side wall of the nozzle have a scalloped shape. In a cross-sectional view of the nozzle, it is preferable that 30% or more of the side wall along a nozzle thickness (nozzle length in a thickness direction of the nozzle-forming substrate) have a scalloped shape, it is more preferable that 50% or more of the side wall have a scalloped shape, and it is even more preferable that 80% or more of the side wall have a scalloped shape.

The thickness of the nozzle-forming substrate is preferably greater than or equal to 20 μm. Although there is no limitation, the thickness is more preferably from 20 to 300 μm, even more preferably from 30 to 200 μm, still more preferably from 40 to 100 μm, and particularly preferably from 45 to 80 μm. It is preferable that the nozzle length in the thickness direction of the nozzle-forming substrate be also within the ranges mentioned above.

A diameter of the nozzle, which is an outermost diameter on the ink-ejection side, is preferably from 5 to 50 μm, more preferably from 10 to 40 μm, and even more preferably from 15 to 30 μm. These ranges are preferable because nozzles can be easily formed, and better ejection performance can be easily obtained.

The material of the nozzle-forming substrate is preferably a material that can be surface-etched by being subjected to an etching process and is more preferably an inorganic material. Examples of the material include metals, semi-metals, and inorganic compounds thereof. For example, the material may be silicon.

As is apparent from FIG. 1, the scallop width $S1$ is a distance between adjacent protrusions of the scalloped shape, and the notch depth $S2$ is a depth of a recess formed in the side wall surface in a vicinity of the open end of the nozzle. When a plurality of protrusions or recesses are present, the scallop width $S1$ is the average of distances determined as described above, and the notch depth $S2$ is the average of depths determined as described above. When the relationship of $S1/S2 \geq 4$ is satisfied, instances in which the aqueous ink is left on scallop stepped portions are reduced, and therefore, excellent ejection reliability is achieved. From a similar standpoint, $S1/S2$ is preferably from 4 to 30, more preferably from 4.5 to 20, even more preferably from 5 to 15, and still more preferably from 5 to 10. In addition, the above-mentioned ranges of $S1/S2$ are preferable because nozzle holes can be easily produced.

It is preferable that the scallop width $S1$ and the notch depth $S2$ be each less than or equal to 1.0 μm. The scallop width $S1$ is preferably from 0.3 to 1.0 μm, more preferably from 0.4 to 0.8 μm, and particularly preferably from 0.45 to 0.7 μm. The notch depth $S2$ is preferably from 0.01 to 0.3 μm, and more preferably from 0.015 to 0.2 μm, and particularly preferably from 0.02 to 0.15 μm. These ranges are preferable because nozzles can be easily formed, and better nozzle performance can be easily obtained.

It is preferable that the nozzles be nozzles formed by performing an etching process and an etching side wall protection process alternately and repeatedly several times. This is preferable because a high-density nozzle array can be easily produced, and the production can be carried out with high precision. This is preferable because the thus-produced ink jet head enables high-resolution and high-definition image recording. Formation of such nozzles tends to render the side walls of the nozzles scalloped-shaped. With the thus-formed nozzles, there is a tendency for the excellent ejection reliability of the aqueous ink to be exhibited even more effectively.

The method for forming the nozzles may be, for example, a method for forming nozzles by using a BOSCH process. More specifically, the nozzles are formed by etching a silicon substrate by performing dry etching in multiple steps.

Figure 2:
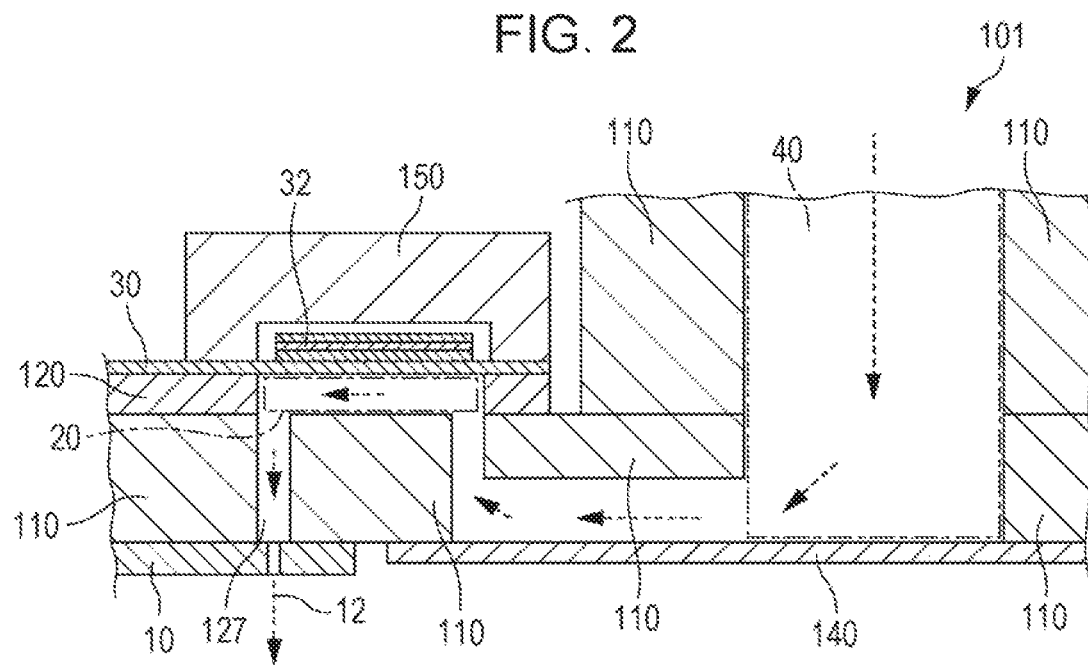
FIG. 2 is a cross-sectional view illustrating a portion of an ink jet head.

FIG. 2 is a cross-sectional view illustrating a portion of an example of the ink jet head. The ink jet head 101 includes a nozzle plate 10, which is the nozzle-forming substrate, a channel-forming substrate 110, a pressure chamber substrate 120, a diaphragm 30, a piezoelectric element 32, a compliance sheet 140, and a cover 150. The nozzle plate 10 includes a nozzle 127 formed therein. The nozzle 127 is an orifice extending through the nozzle plate 10. A pressure chamber 20 is formed as a space defined by the channel-forming substrate 110, the pressure chamber substrate 120, and the diaphragm 30. Displacement of the diaphragm 30 causes the volume of the pressure chamber 20 to change, thereby generating a force for ejecting ink from the nozzles. An ink supply chamber 40 is formed as a space defined by the channel-forming substrate 110 and the compliance sheet 140. A channel is formed as a passageway for ink defined by the channel-forming substrate 110 and the compliance sheet 140. The channel extends from the ink supply chamber to the pressure chamber and from the pressure chamber to the nozzle. The ink flows and moves along the arrows illustrated in FIG. 2 and is ejected from the nozzle. In FIG. 2, reference numeral 12 indicates a portion where the ink is ejected from the nozzle.

Figure 3:
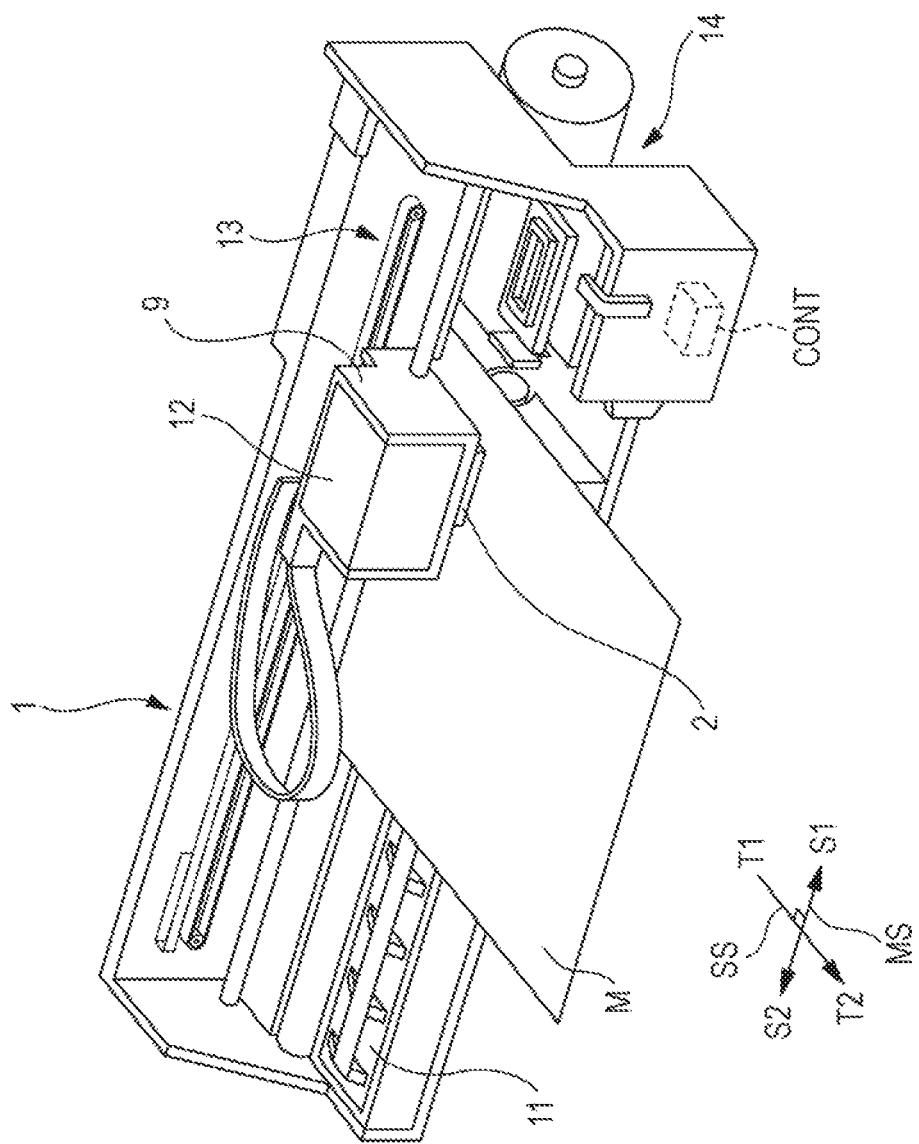
FIG. 3 is a perspective view illustrating an ink jet recording apparatus.

FIG. 3 is a perspective view illustrating an exemplary configuration of an ink jet recording apparatus. As illustrated in FIG. 3, an ink jet recording apparatus 1 includes an ink jet head 2, a carriage 9, a platen 11, a carriage movement mechanism 13, a transport unit 14, a controller CONT, and an ink container 12. In the ink jet recording apparatus 1, the controller CONT illustrated in FIG. 3 controls the operation of the entire ink jet recording apparatus 1. The ink jet head 2 performs recording on a recording medium M by ejecting ink from the nozzles disposed in the bottom of the ink jet head 2 and adhering the ink to the recording medium M. While main scanning is performed in a main scanning direction MS relative to the recording medium M, the ink jet head 2 ejects ink to adhere the ink to the recording medium M. The recording medium M is transported in a transport direction SS, and sub-scanning is performed. Main scanning and sub-scanning are performed alternately and repeatedly, thereby carrying out recording.

Ink Jet Recording Method

An ink jet recording method of the present embodiment is an ink jet recording method that is implemented by using an ink jet head including nozzles, the nozzles being configured such that a shape of the side wall surface is a scalloped shape in which a scallop width S1 and a notch depth S2 satisfy a relationship of S1/S2≥4. The ink jet recording method includes an ejection step of ejecting the aqueous ink of the present embodiment from an ink jet head.

Ejection Step

In the ejection step, for example, the aqueous ink is ejected from an ink jet head and is thereby adhered to a recording medium. Examples of the method for ejection include known methods.

Examples of the recording medium include, but are not limited to, dedicated ink jet paper, PPC paper, fabrics, surface-treated paper (e.g., aluminum-deposited paper, coated paper, art paper, and cast coated paper), and plastic films (e.g., polycarbonate films, PET films, and vinyl chloride sheets) formed with an ink-receiving layer.

EXAMPLES

The present disclosure will now be described in more detail with reference to examples and comparative examples. The present disclosure is in no way limited to the examples described below.

Preparation of Resin Particles (1) Preparation of Styrene Acrylic Resin Particles Containing No Methacrylic Monomer as Constituent Component Into a reaction vessel equipped with a dropping device, a thermometer, a water-cooled reflux condenser, and a stirrer, 100 parts by mass of ion-exchanged water was placed, and under stirring, 0.4 parts by mass of potassium persulfate, which was used as a polymerization initiator, was added in a nitrogen atmosphere at 70° C. Into the reaction vessel, a monomer solution was added dropwise at 70° C. to cause a polymerization reaction. The monomer solution included 37 parts by mass of ion-exchanged water, 0.25 parts by mass of sodium lauryl sulfate, 22 parts by mass of styrene, 50 parts by mass of n-butyl acrylate, 47 parts by mass of methyl acrylate, 20 parts by mass of ethyl acrylate, 5 parts by mass of acrylic acid, and 0.52 parts by mass of tert-dodecyl mercaptan. The contents of the reaction vessel after the reaction were neutralized with sodium hydroxide to adjust the pH to a pH of from 8 to 8.5 and were filtered through a 0.3-µm filter. Thus, an aqueous dispersion liquid of resin particles was prepared.

(2) Preparation of Styrene Acrylic Resin Particles Containing Methacrylic Monomer as Constituent Component An aqueous dispersion liquid of resin particles was prepared in a manner similar to that for "(1) Preparation of styrene acrylic resin particles containing no methacrylic monomer as constituent component" except that the monomer components of the monomer solution were changed to 22 parts by mass of styrene, 25 parts by mass of n-butyl acrylate, 25 parts by mass of n-butyl methacrylate, 23 parts by mass of methyl acrylate, 24 parts by mass of methyl methacrylate, 10 parts by mass of ethyl acrylate, 10 parts by mass of ethyl methacrylate, 2.5 parts by mass of acrylic acid, and 2.5 parts by mass of methacrylic acid.

(3) Preparation of Styrene Acrylic Resin Particles Containing α-Methylstyrene Monomer as Constituent Component An aqueous dispersion liquid of resin particles was prepared in a manner similar to that for "(1) Preparation of styrene acrylic resin particles containing no methacrylic monomer as constituent component" except that the monomer components of the monomer solution were changed to 11 parts by mass of styrene, 11 parts by mass of α-methylstyrene, 50 parts by mass of n-butyl acrylate, 47 parts by mass of methyl acrylate, 20 parts by mass of ethyl acrylate, and 5 parts by mass of acrylic acid.

Preparation of Aqueous Ink Jet Ink Composition

A mixture was obtained by mixing a pigment shown in the tables below with a dispersant in water in a manner such that the ratio of the content of the pigment to the content of the dispersant was 2:1 (mass ratio). Subsequently, in a sand mill (a product of Yasukawa Seisakusho Co., Ltd.), the mixture was dispersed with glass beads having a diameter of 1.7 mm for 2 to 5 hours. Thus, a pigment dispersion liquid was prepared. The content of the glass beads in the sand mill was 1.5 times the content of the liquid mixture. The average particle diameter of the pigment was adjusted by, for example, appropriately adjusting the dispersion time or subjecting the prepared dispersion liquid to size classification using a centrifuge (a CR-20B2 and a ROTOR No. 36, which are products of Hitachi Koki Co., Ltd.). The dispersant used was Joncryl 63D (manufactured by BASF). Next, the pigment dispersion liquid after the adjustment, the resin particle dispersion liquid, and the other components shown in the tables below were mixed together and stirred, and then the mixture was filtered through a 5-μm filter. Thus, an aqueous ink jet ink composition was prepared. Note that in the tables, the numerical values are expressed in parts by mass, and the total amount of the aqueous ink jet ink composition corresponds to 100.0 parts by mass. The contents of the pigment and the resin particles are on a solids basis.

Note that the average particle diameter of the pigment was determined as follows. A sample was prepared by diluting the aqueous ink jet ink composition with pure water in a manner such that the pigment concentration became 50 ppm. The sample was analyzed by using a dynamic light scattering Nanotrac particle size distribution analyzer (a model Nanotrac 150, which is a product of Nikkiso Co. Ltd.) to measure a volume average particle diameter D50.

TABLE 1

| | | | Example 1 | Example 2 | Example 3 | Example 4 | Example 5 | Example 6 | Example 7 |
|---|---|---|---|---|---|---|---|---|---|
| Head | | S1/S2 | 4 | 5 | 15 | 5 | 5 | 5 | 5 |
| Compound represented by general formula (1) | ethylene glycol | (Nippon Nyukazai) | 8.0 | 8.0 | 8.0 | 2.0 | 4.0 | 14.0 | 16.0 |
| | propylene glycol | (Adeka) | — | — | — | — | — | — | — |
| | 1,4-butanediol | (Tokyo Chemical Industry) | — | — | — | — | — | — | — |
| | 1,5-pentanediol | (Tokyo Chemical Industry) | — | — | — | — | — | — | — |
| | ethylene glycol monomethyl ether | MG (Nippon Nyukazai) | — | — | — | — | — | — | — |
| | propylene glycol monomethyl ether | MFG (Nippon Nyukazai) | — | — | — | — | — | — | — |
| | 1-methoxy butanol | (Tokyo Chemical Industry) | — | — | — | — | — | — | — |
| | ethylene glycol monoethyl ether | (Tokyo Chemical Industry) | — | — | — | — | — | — | — |
| | propylene glycol monoethyl ether | (Tokyo Chemical Industry) | — | — | — | — | — | — | — |
| | diethylene glycol | (Nippon Nyukazai) | — | — | — | — | — | — | — |
| | diethylene glycol monomethyl ether | MDG (Nippon Nyukazai) | — | — | — | — | — | — | — |
| | diethylene glycol monoethyl ether | (Tokyo Chemical Industry) | — | — | — | — | — | — | — |
| | dipropylene glycol | (Adeka) | — | — | — | — | — | — | — |
| | dipropylene glycol monomethyl ether | MFDG (Nippon Nyukazai) | — | — | — | — | — | — | — |
| Additional solvent | glycerol | (Sakamoto Yakuhin Kogyo) | 9.0 | 9.0 | 9.0 | 9.0 | 9.0 | 9.0 | 9.0 |
| | 2-pyrrolidone | (Tokyo Chemical Industry) | 1.0 | 1.0 | 1.0 | 1.0 | 1.0 | — | — |
| | triethylene glycol | (Nippon Nyukazai) | — | — | — | 6.0 | 4.0 | — | — |
| | 3-methyl-1,5-pentanediol | (Tokyo Chemical Industry) | 3.0 | 3.0 | 3.0 | 3.0 | 3.0 | 3.0 | 3.0 |
| Specific penetrating solvent | 1,2-hexanediol | (Tokyo Chemical Industry) | — | — | — | — | — | — | — |
| Surfactant | BYK-348 | BYK Japan | 0.3 | 0.3 | 0.3 | 0.3 | 0.3 | 0.3 | 0.3 |
| Neutralizing agent | triisopropanolamine | (Tokyo Chemical Industry) | 2.0 | 2.0 | 2.0 | 2.0 | 2.0 | 2.0 | 2.0 |
| Pigment | carbon black | average particle diameter 110 nm | 6.0 | 6.0 | 6.0 | 6.0 | 6.0 | 6.0 | 6.0 |
| Resin particles (solids content) | styrene acrylic resin particles (containing no methacrylic component) | preparation | 1.0 | 1.0 | 1.0 | 1.0 | 1.0 | 1.0 | 1.0 |
| Pure water | | | balance | balance | balance | balance | balance | balance | balance |
| | Total | | 100.0 | 100.0 | 100.0 | 100.0 | 100.0 | 100.0 | 100.0 |
| | Mass ratio (specific penetrating solvent/compound represented by general formula (1)) | | 0.0 | 0.0 | 0.0 | 0.0 | 0.0 | 0.0 | 0.0 |
| Evaluations | Ejection reliability | Intermittent printability | A | A | A | B | A | A | A |
| | | High-temperature continuous printability | B | A | AA | B | B | AA | AA |
| | Settling characteristics | | A | A | A | A | A | A | A |
| | Film properties (abrasion resistance) | | A | A | A | A | A | B | B |
| | Ink storage stability | | A | A | A | A | A | A | B |
| | Image quality OD value | | A | A | A | A | A | A | A |
| | Filling characteristics | | B | B | B | B | B | B | B |

TABLE 2

| | | Example 8 | Example 9 | Example 10 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|---|
| Head | S1/S2 | 15 | 15 | 15 | 15 | 15 | 15 | 15 | 15 | 15 | 15 | 15 | 15 | 15 |
| Compound represented by general formula (1) | ethylene glycol (Nippon Nyukazai) | — | — | — | — | — | — | — | — | — | — | — | — | — |
| | propylene glycol (Adeka) | 8.0 | — | — | — | — | — | — | — | — | — | — | — | — |
| | 1,4-butanediol (Tokyo Chemical Industry) | — | 8.0 | — | — | — | — | — | — | — | — | — | — | — |
| | 1,5-pentanediol (Tokyo Chemical Industry) | — | — | 8.0 | — | — | — | — | — | — | — | — | — | — |
| | ethylene glycol monomethyl ether MG (Nippon Nyukazai) | — | — | — | 8.0 | — | — | — | — | — | — | — | — | — |
| | propylene glycol monomethyl ether MFG (Nippon Nyukazai) | — | — | — | — | 8.0 | — | — | — | — | — | — | — | — |
| | 1-methoxy butanol (Tokyo Chemical Industry) | — | — | — | — | — | 8.0 | — | — | — | — | — | — | — |
| | ethylene glycol monoethyl ether (Tokyo Chemical Industry) | — | — | — | — | — | — | 8.0 | — | — | — | — | — | — |
| | propylene glycol monoethyl ether (Nippon Nyukazai) | — | — | — | — | — | — | — | 8.0 | — | — | — | — | — |
| | diethylene glycol monomethyl ether MDG (Nippon Nyukazai) | — | — | — | — | — | — | — | — | 8.0 | — | — | — | — |
| | diethylene glycol monoethyl ether (Tokyo Chemical Industry) | — | — | — | — | — | — | — | — | — | 8.0 | — | — | — |
| | dipropylene glycol (Adeka) | — | — | — | — | — | — | — | — | — | — | 8.0 | — | — |
| | dipropylene glycol monomethyl ether MFDG (Nippon Nyukazai) | — | — | — | — | — | — | — | — | — | — | — | 8.0 | 8.0 |
| Additional solvent | glycerol (Sakamoto Yakuhin Kogyo) | 9.0 | 9.0 | 9.0 | 9.0 | 9.0 | 9.0 | 9.0 | 9.0 | 9.0 | 9.0 | 9.0 | 9.0 | 9.0 |
| | 2-pyrrolidone (Tokyo Chemical Industry) | 1.0 | 1.0 | 1.0 | 1.0 | 1.0 | 1.0 | 1.0 | 1.0 | 1.0 | 1.0 | 1.0 | 1.0 | 1.0 |
| | triethylene glycol (Nippon Nyukazai) | — | — | — | — | — | — | — | — | — | — | — | — | — |
| Specific penetrating solvent | 3-methyl-1,5-pentanediol (Tokyo Chemical Industry) | 3.0 | 3.0 | 3.0 | 3.0 | 3.0 | 3.0 | 3.0 | 3.0 | 3.0 | 3.0 | 3.0 | 3.0 | 3.0 |
| | 1,2-hexanediol (Tokyo Chemical Industry) | — | — | — | — | — | — | — | — | — | — | — | — | — |
| Surfactant | BYK-348 BYK Japan | 0.3 | 0.3 | 0.3 | 0.3 | 0.3 | 0.3 | 0.3 | 0.3 | 0.3 | 0.3 | 0.3 | 0.3 | 0.3 |
| Neutralizing agent | triisopropanolamine (Tokyo Chemical Industry) | 2.0 | 2.0 | 2.0 | 2.0 | 2.0 | 2.0 | 2.0 | 2.0 | 2.0 | 2.0 | 2.0 | 2.0 | 2.0 |
| Pigment | carbon black | 6.0 | 6.0 | 6.0 | 6.0 | 6.0 | 6.0 | 6.0 | 6.0 | 6.0 | 6.0 | 6.0 | 6.0 | 6.0 |
| Resin particles (solids content) | styrene acrylic resin particles average particle diameter 110 nm preparation (containing no methacrylic component) | 1.0 | 1.0 | 1.0 | 1.0 | 1.0 | 1.0 | 1.0 | 1.0 | 1.0 | 1.0 | 1.0 | 1.0 | 1.0 |
| Pure water | | balance | balance | balance | balance | balance | balance | balance | balance | balance | balance | balance | balance | balance |
| | Total | 100.0 | 100.0 | 100.0 | 100.0 | 100.0 | 100.0 | 100.0 | 100.0 | 100.0 | 100.0 | 100.0 | 100.0 | 100.0 |
| | Mass ratio (specific penetrating solvent/compound represented by general formula (1)) | 0.0 | 0.0 | 0.0 | 0.0 | 0.0 | 0.0 | 0.0 | 0.0 | 0.0 | 0.0 | 0.0 | 0.0 | 0.0 |
| Evaluations | Ejection reliability | A | A | A | A | A | A | A | A | A | A | A | A | A |
| | Intermittent printability | AA | A | A | A | AA | A | A | A | AA | B | B | AA | B |
| | High-temperature continuous printability | A | A | A | A | AA | A | A | A | A | B | B | AA | B |
| | Settling characteristics | A | A | A | A | A | A | A | A | A | A | A | A | A |
| | Film properties (abrasion resistance) | A | A | A | A | A | A | A | A | A | A | A | A | A |
| | Ink storage stability | A | A | A | A | A | A | A | A | A | A | A | A | A |
| | Image quality OD value | A | A | A | A | A | A | A | A | A | A | A | A | A |
| | Filling characteristics | B | B | B | B | B | B | B | B | B | B | B | B | B |

TABLE 3

| | | | Example 21 | Example 22 | Example 23 | Example 24 | Example 25 | Example 26 | Example 27 | Example 28 | Example 29 | Example 30 | Example 31 | Example 32 | Example 33 |
|---|---|---|---|---|---|---|---|---|---|---|---|---|---|---|---|
| Head | | S1/S2 | 4 | 4 | 4 | 4 | 4 | 4 | 4 | 4 | 4 | 5 | 5 | 5 | 5 |
| Compound represented by general formula (1) | ethylene glycol | (Nippon Nyukazai) | 8.0 | 8.0 | 8.0 | 8.0 | 8.0 | 8.0 | 8.0 | 8.0 | 8.0 | 8.0 | 8.0 | 8.0 | 8.0 |
| Additional solvent | glycerol | (Sakamoto Yakuhin Kogyo) | 9.0 | 9.0 | 8.0 | 7.5 | 7.5 | 7.5 | 7.0 | 5.0 | 4.5 | 9.0 | 9.0 | 9.0 | 9.0 |
| | 2-pyrrolidone | (Tokyo Chemical Industry) | — | 1.0 | 1.0 | 1.0 | 1.0 | 1.0 | 1.0 | 1.0 | 1.0 | 1.0 | 1.0 | 1.0 | 1.0 |
| | triethylene glycol | (Nippon Nyukazai) | — | — | — | — | — | — | — | — | — | 3.0 | 3.0 | 3.0 | 3.0 |
| | 3-methyl-1,5-pentanediol | (Tokyo Chemical Industry) | 3.0 | 3.0 | 4.0 | 4.5 | — | — | 5.0 | 7.0 | 7.5 | — | — | — | — |
| Specific penetrating solvent | 1,2-hexanediol | (Tokyo Chemical Industry) | — | — | — | — | 4.5 | — | — | — | — | — | — | — | — |
| | diethylene glycol monobutyl ether | BDG (Nippon Nyukazai) | — | — | — | — | — | 4.5 | — | — | — | — | — | — | — |
| | triethylene glycol monobutyl ether | BTG (Nippon Nyukazai) | — | — | — | — | — | — | — | — | — | — | — | — | — |
| Surfactant | BYK-348 | BYK Japan | 0.3 | 0.3 | 0.3 | 0.3 | 0.3 | 0.3 | 0.3 | 0.3 | 0.3 | 0.3 | 0.3 | 0.3 | 0.3 |
| Neutralizing agent | triisopropanolamine | (Tokyo Chemical Industry) | 2.0 | 2.0 | 2.0 | 2.0 | 2.0 | 2.0 | 2.0 | 2.0 | 2.0 | 2.0 | 2.0 | 2.0 | 2.0 |
| Pigment | carbon black | average particle diameter 110 nm preparation | 6.0 | 6.0 | 6.0 | 6.0 | 6.0 | 6.0 | 6.0 | 6.0 | 6.0 | 6.0 | 6.0 | 6.0 | 6.0 |
| | | average particle diameter 80 nm preparation | — | — | — | — | — | — | — | — | — | — | — | — | — |
| | | average particle diameter 90 nm preparation | — | — | — | — | — | — | — | — | — | — | — | — | — |
| | | average particle diameter 130 nm preparation | — | — | — | — | — | — | — | — | — | — | — | — | — |
| | | average particle diameter 140 nm preparation | — | — | — | — | — | — | — | — | — | — | — | — | — |
| Resin particles (solids content) | styrene acrylic resin particles (containing no methacrylic component) | | 1.0 | 1.0 | 1.0 | 1.0 | 1.0 | 1.0 | 1.0 | 1.0 | 1.0 | — | — | — | — |
| | styrene acrylic resin particles (containing methacrylic component) | | — | — | — | — | — | — | — | — | — | 1.0 | — | — | — |
| | styrene acrylic resin particles (containing α-methylstyrene) | | — | — | — | — | — | — | — | — | — | — | 1.0 | — | — |
| | urethane resin particles | WBR-016U (Taisei Fine Chemical) | — | — | — | — | — | — | — | — | — | — | — | 1.0 | — |
| | polyester resin particles | Vylonal MD-1100 (Toyobo) | — | — | — | — | — | — | — | — | — | — | — | — | 1.0 |
| Pure water | | | balance | balance | balance | balance | balance | balance | balance | balance | balance | balance | balance | balance | balance |
| | | Total | 100.0 | 100.0 | 100.0 | 100.0 | 100.0 | 100.0 | 100.0 | 100.0 | 100.0 | 100.0 | 100.0 | 100.0 | 100.0 |
| Mass ratio (specific penetrating solvent/compound represented by general formula (1)) | | | 0.4 | 0.4 | 0.5 | 0.6 | 0.6 | 0.6 | 0.6 | 0.9 | 0.9 | 0.0 | 0.0 | 0.0 | 0.0 |
| Evaluations | Ejection reliability | | A | AA | AA | AA | AA | AA | AA | AA | AA | AA | AA | A | A |
| | Intermittent printability | | B | A | B | B | B | B | B | B | B | A | AA | B | A |
| | High-temperature continuous printability | | A | A | A | A | A | A | A | A | A | A | A | A | A |
| | Settling characteristics | | B | A | A | A | B | B | A | A | B | A | A | A | A |
| | Film properties (abrasion resistance) | | A | A | A | A | A | A | A | A | A | A | A | A | B |
| | Ink storage stability | | A | A | A | AA | A | A | AA | A | AA | B | B | B | A |
| | Image quality OD value | | A | A | A | A | A | A | A | A | A | A | A | A | A |
| | Filling characteristics | | | | | | | | | | | B | B | B | B |

TABLE 4

| | | | Example 34 | Example 35 | Example 36 | Example 37 | Example 38 |
|---|---|---|---|---|---|---|---|
| Head | | S1/S2 | 4 | 4 | 4 | 4 | 4 |
| Compound represented by general formula (1) | ethylene glycol | (Nippon Nyukazai) | 8.0 | 8.0 | 8.0 | 8.0 | 8.0 |
| Additional solvent | glycerol | (Sakamoto Yakuhin Kogyo) | 9.0 | 9.0 | 9.0 | 8.0 | 9.0 |
| | 2-pyrrolidone | (Tokyo Chemical Industry) | 1.0 | 1.0 | 1.0 | 1.0 | 1.0 |
| | triethylene glycol | (Nippon Nyukazai) | 3.0 | 2.0 | 1.0 | — | — |
| | 3-methyl-1,5-pentanediol | (Tokyo Chemical Industry) | 3.0 | 3.0 | 3.0 | 3.0 | 3.0 |
| Specific penetrating solvent | 1,2-hexanediol | (Tokyo Chemical Industry) | — | — | — | — | — |
| | diethylene glycol monobutyl ether | BDG (Nippon Nyukazai) | — | — | — | — | — |
| | triethylene glycol monobutyl ether | BTG (Nippon Nyukazai) | — | — | — | — | — |
| Surfactant | BYK-348 | BYK Japan | 0.3 | 0.3 | 0.3 | 0.3 | 0.3 |
| Neutralizing agent | triisopropanolamine | (Tokyo Chemical Industry) | 2.0 | 2.0 | 2.0 | 2.0 | 2.0 |
| Pigment | carbon black | average particle diameter 110 nm | 3.0 | 4.0 | 5.0 | 7.0 | — |
| | | average particle diameter 80 nm | — | — | — | — | 6.0 |
| | | average particle diameter 90 nm | — | — | — | — | — |
| | | average particle diameter 130 nm | — | — | — | — | — |
| | | average particle diameter 140 nm | — | — | — | — | — |
| Resin particles (solids content) | styrene acrylic resin particles (containing no methacrylic component) | preparation | 1.0 | 1.0 | 1.0 | 1.0 | 1.0 |
| | styrene acrylic resin particles (containing methacrylic component) | preparation | — | — | — | — | — |
| | styrene acrylic resin particles (containing α-methylstyrene) | preparation | — | — | — | — | — |
| | urethane resin particles | WBR-016U (Taisei Fine Chemical) | — | — | — | — | — |
| | polyester resin particles | Vylonal MD-1100 (Toyobo) | — | — | — | — | — |
| Pure water | | | balance | balance | balance | balance | balance |
| | | Total | 100.0 | 100.0 | 100.0 | 100.0 | 100.0 |
| | Mass ratio (specific penetrating solvent/compound represented by general formula (1)) | | 0.0 | 0.0 | 0.0 | 0.0 | 0.0 |
| Evaluations | Ejection reliability | Intermittent printability | AA | AA | A | B | A |
| | | High-temperature continuous printability | A | A | A | A | B |
| | | Settling characteristics | A | A | A | A | AA |
| | | Film properties (abrasion resistance) | A | A | A | A | A |
| | | Ink storage stability | A | A | A | A | A |
| | | Image quality OD value | B | B | A | AA | A |
| | | Filling characteristics | B | B | B | B | B |

| | | | Example 39 | Example 40 | Example 41 | Example 42 | Example 43 |
|---|---|---|---|---|---|---|---|
| Head | | S1/S2 | 4 | 4 | 4 | 4 | 4 |
| Compound represented by general formula (1) | ethylene glycol | (Nippon Nyukazai) | 8.0 | 8.0 | 8.0 | 8.0 | 8.0 |
| Additional solvent | glycerol | (Sakamoto Yakuhin Kogyo) | 9.0 | 9.0 | 9.0 | 10.0 | 11.0 |
| | 2-pyrrolidone | (Tokyo Chemical Industry) | 1.0 | 1.0 | 1.0 | 1.0 | 1.0 |
| | triethylene glycol | (Nippon Nyukazai) | — | — | — | — | — |
| | 3-methyl-1,5-pentanediol | (Tokyo Chemical Industry) | 3.0 | 3.0 | 3.0 | 3.0 | 3.0 |
| Specific penetrating solvent | 1,2-hexanediol | (Tokyo Chemical Industry) | — | — | — | — | — |
| | diethylene glycol monobutyl ether | BDG (Nippon Nyukazai) | — | — | — | — | — |
| | triethylene glycol monobutyl ether | BTG (Nippon Nyukazai) | — | — | — | — | — |
| Surfactant | BYK-348 | BYK Japan | 0.3 | 0.3 | 0.3 | 0.3 | 0.3 |
| Neutralizing agent | triisopropanolamine | (Tokyo Chemical Industry) | 2.0 | 2.0 | 2.0 | 2.0 | 2.0 |
| Pigment | carbon black | average particle diameter 110 nm | — | — | — | 5.0 | 5.0 |
| | | average particle diameter 80 nm | — | — | — | — | — |
| | | average particle diameter 90 nm | 6.0 | — | — | — | — |
| | | average particle diameter 130 nm | — | 6.0 | — | — | — |
| | | average particle diameter 140 nm | — | — | 6.0 | — | — |
| Resin particles (solids content) | styrene acrylic resin particles (containing no methacrylic component) | preparation | 1.0 | 1.0 | 1.0 | 1.0 | 1.0 |
| | styrene acrylic resin particles (containing methacrylic component) | preparation | — | — | — | — | — |
| | styrene acrylic resin particles (containing α-methylstyrene) | preparation | | | | | |

TABLE 4-continued

|  |  |  |  |  |  |  |  |
|---|---|---|---|---|---|---|---|
|  | urethane resin particles | WBR-016U (Taisei Fine Chemical) | — | — | — | — | — |
|  | polyester resin particles | Vylonal MD-1100 (Toyobo) | — | — | — | — | — |
| Pure water |  |  | balance | balance | balance | balance | balance |
|  |  | Total | 100.0 | 100.0 | 100.0 | 100.0 | 100.0 |
| Mass ratio (specific penetrating solvent/compound represented by general formula (1)) |  |  | 0.0 | 0.0 | 0.0 | 0.0 | 0.0 |
| Evaluations | Ejection reliability | Intermittent printability | A | A | A | A | B |
|  |  | High-temperature continuous printability | A | A | A | B | B |
|  |  | Settling characteristics | AA | A | B | A | A |
|  |  | Film properties (abrasion resistance) | A | A | A | A | B |
|  |  | Ink storage stability | A | A | A | A | A |
|  |  | Image quality OD value | A | A | A | AA | AA |
|  |  | Filling characteristics | B | B | B | B | B |

TABLE 5

|  |  |  | Comparative example 1 | Comparative example 2 | Comparative example 3 | Comparative example 4 | Comparative example 5 |
|---|---|---|---|---|---|---|---|
| Head |  | S1/S2 | 3 | 15 | 15 | 15 | 15 |
| Compound represented by general formula (1) | ethylene glycol | (Nippon Nyukazai) | 8.0 | — | — | — | — |
| Additional solvent | glycerol | (Sakamoto Yakuhin Kogyo) | 9.0 | 9.0 | 9.0 | 9.0 | 9.0 |
|  | 2-pyrrolidone | (Tokyo Chemical Industry) | 1.0 | 1.0 | 1.0 | 1.0 | 1.0 |
|  | triethylene glycol | (Nippon Nyukazai) | — | — | — | — | — |
|  | 3-methyl-1,5-pentanediol | (Tokyo Chemical Industry) | 3.0 | 3.0 | — | — | — |
| Specific penetrating solvent | 1,2-hexanediol | (Tokyo Chemical Industry) | — | — | 3.0 | 11.0 | — |
|  | diethylene glycol monobutyl ether | BDG (Nippon Nyukazai) | — | — | — | — | 3.0 |
|  | triethylene glycol monobutyl ether | BTG (Nippon Nyukazai) | — | — | — | — | — |
| Surfactant | BYK-348 | BYK Japan | 0.3 | 0.3 | 0.3 | 0.3 | 0.3 |
| Neutralizing agent | triisopropanolamine | (Tokyo Chemical Industry) | 2.0 | 2.0 | 2.0 | 2.0 | 2.0 |
| Pigment | carbon black | average particle diameter 110 nm | 6.0 | 6.0 | 6.0 | 6.0 | 6.0 |
|  |  | average particle diameter 80 nm | — | — | — | — | — |
|  |  | average particle diameter 90 nm | — | — | — | — | — |
|  |  | average particle diameter 130 nm | — | — | — | — | — |
|  |  | average particle diameter 140 nm | — | — | — | — | — |
| Resin particles (solids content) | styrene acrylic resin particles (containing no methacrylic component) | preparation | 1.0 | 1.0 | 1.0 | 1.0 | 1.0 |
|  | styrene acrylic resin particles (containing methacrylic component) | preparation | — | — | — | — | — |
|  | styrene acrylic resin particles (containing α-methylstyrene) | preparation | — | — | — | — | — |
|  | urethane resin particles | WBR-016U (Taisei Fine Chemical) | — | — | — | — | — |
|  | polyester resin particles | Vylonal MD-1100 (Toyobo) | — | — | — | — | — |
| Pure water |  |  | balance | balance | balance | balance | balance |
|  |  | Total | 100.0 | 100.0 | 100.0 | 100.0 | 100.0 |
|  | Mass ratio (specific penetrating solvent/compound represented by general formula (1)) |  | 0.0 | — | — | — | — |
| Evaluations | Ejection reliability | Intermittent printability | C | C | C | C | C |
|  |  | High-temperature continuous printability | C | C | C | C | C |
|  |  | Settling characteristics | A | A | A | A | A |
|  |  | Film properties (abrasion resistance) | A | B | A | A | A |
|  |  | Ink storage stability | A | A | A | B | B |
|  |  | Image quality OD value | A | A | A | A | A |
|  |  | Filling characteristics | B | B | A | A | A |

|  |  |  | Comparative example 6 | Comparative example 7 | Reference example 1 | Reference example 2 | Reference example 3 |
|---|---|---|---|---|---|---|---|
| Head |  | S1/S2 | 15 | 15 | Different head 1 | Different head 1 | Different head 2 |
| Compound represented by general formula (1) | ethylene glycol | (Nippon Nyukazai) | — | — | 8.0 | — | — |

TABLE 5-continued

| | | | | | | | |
|---|---|---|---|---|---|---|---|
| Additional solvent | glycerol | (Sakamoto Yakuhin Kogyo) | 9.0 | 9.0 | 9.0 | 9.0 | 9.0 |
| | 2-pyrrolidone | (Tokyo Chemical Industry) | 1.0 | 1.0 | 1.0 | 1.0 | 1.0 |
| | triethylene glycol | (Nippon Nyukazai) | 8.0 | — | — | — | — |
| | 3-methyl-1,5-pentanediol | (Tokyo Chemical Industry) | — | 12.0 | 3.0 | 3.0 | 3.0 |
| Specific penetrating solvent | 1,2-hexanediol | (Tokyo Chemical Industry) | — | — | — | — | — |
| | diethylene glycol monobutyl ether | BDG (Nippon Nyukazai) | — | — | — | — | — |
| | triethylene glycol monobutyl ether | BTG (Nippon Nyukazai) | — | — | — | — | — |
| Surfactant | BYK-348 | BYK Japan | 0.3 | 0.3 | 0.3 | 0.3 | 0.3 |
| Neutralizing agent | triisopropanolamine | (Tokyo Chemical Industry) | 2.0 | 2.0 | 2.0 | 2.0 | 2.0 |
| Pigment | carbon black | average particle diameter 110 nm | 6.0 | 6.0 | 6.0 | 6.0 | 6.0 |
| | | average particle diameter 80 nm | — | — | — | — | — |
| | | average particle diameter 90 nm | — | — | — | — | — |
| | | average particle diameter 130 nm | — | — | — | — | — |
| | | average particle diameter 140 nm | — | — | — | — | — |
| Resin particles (solids content) | styrene acrylic resin particles (containing no methacrylic component) | preparation | 1.0 | 1.0 | 1.0 | 1.0 | 1.0 |
| | styrene acrylic resin particles (containing methacrylic component) | preparation | — | — | — | — | — |
| | styrene acrylic resin particles (containing α-methylstyrene) | preparation | — | — | — | — | — |
| | urethane resin particles | WBR-016U (Taisei Fine Chemical) | — | — | — | — | — |
| | polyester resin particles | Vylonal MD-1100 (Toyobo) | — | — | — | — | — |
| Pure water | | | balance | balance | balance | balance | balance |
| | | Total | 100.0 | 100.0 | 100.0 | 100.0 | 100.0 |
| Mass ratio (specific penetrating solvent/compound represented by general formula (1)) | | | — | — | 0.0 | — | — |
| Evaluations | Ejection reliability | Intermittent printability | C | C | A | A | A |
| | | High-temperature continuous printability | C | C | A | A | A |
| | | Settling characteristics | A | A | A | A | A |
| | | Film properties (abrasion resistance) | A | A | A | B | B |
| | | Ink storage stability | A | A | A | A | A |
| | | Image quality OD value | A | A | A | A | A |
| | | Filling characteristics | B | B | B | B | B |

To evaluate the physical properties described below, a modified ink jet recording apparatus was prepared by modifying a model SC-T7050, manufactured by Seiko Epson Corporation, and an ink jet head including nozzles was mounted to the modified ink jet recording apparatus. The nozzles were configured such that a shape of the side wall surface was a scalloped shape, and the ratio (S1/S2) of the scallop width S1 to the notch depth S2 was a value shown in Table 1.

The nozzles of the ink jet head were nozzles formed by performing a multi-step dry etching process on a nozzle plate, which was a silicon substrate, by using a BOSCH process. The entirety of the nozzle side wall had a scalloped shape. The nozzles were formed in one row at the nozzle density described below. The nozzle length in the thickness direction of the nozzle plate was 50 μm. An outermost diameter of each of the nozzles on the ejection side was 20 μm.

Note that a different head 1 was an ink jet head including nozzles that did not have a scalloped shape. The nozzles were formed by punching holes in a stainless steel nozzle plate. A different head 2 was an ink jet head including nozzles that did not have a scalloped shape. The nozzles were formed in a manner similar to that for the different head 1. However, in the different head 2, the diameter of the punched hole was varied within the nozzle, and thus a step of 0.2 μm in a nozzle diameter direction was provided approximately at a center of the side wall of the nozzle in a thickness direction of the nozzle plate.

A cartridge was filled with the aqueous ink jet ink composition. Photographic paper (a model PXMC44R13, manufactured by Seiko Epson Corporation) was used as a recording medium. An image with a recording resolution of 1200×1200 dpi was printed as a test pattern. The number of nozzles was 300, and the nozzle density was 300 dpi.

Intermittent Recording Test

The aqueous ink jet ink composition was ejected from all the nozzles in a thermostatic chamber at 40° C. and 20% RH, and a landing position check pattern was recorded. Next, idle running, which is scanning that does not involve ink ejection, was performed for 12 seconds. During that time, flushing was not performed, and a micro-vibration, which is a vibration of such a degree that ink ejection is not caused, was generated during the idle running. Next, the aqueous ink jet ink composition was ejected from all the nozzles, and a landing position check pattern was recorded. Whether or not the ink was ejected from the nozzles and whether or not landing position displacement (dot displacement) occurred were checked, and evaluations were made according to the following evaluation criteria.

Evaluation Criteria

AA: There were no misfiring nozzles, and there was no dot displacement

A: There were no misfiring nozzles, and the number of nozzles that caused dot displacement was not greater than three B: There were no misfiring nozzles, and the number of nozzles that caused dot displacement was greater than three C: There were one or more misfiring nozzles, and there were one or more nozzles that caused dot displacement High-Temperature Continuous Recording Test By using the modified ink jet recording apparatus, printing was performed continuously for 8 hours in a thermostatic chamber at 45° C. and 20% RH. After the printing, a check pattern was printed, and the amount of landing position displacement of the nozzle after printing was measured by using a SmartScope ZIP250 (manufactured by OGP Inc.). The landing position of the first nozzle was used as the reference. Based on the measurement results, evaluations were made according to the following evaluation criteria.

Evaluation Criteria

AA: There were no misfiring nozzles, and the landing displacements were not greater than ±20 μm for all the nozzles A: There were no misfiring nozzles, the number of nozzles that caused a landing displacement of greater than ±20 μm and not greater than ±50 μm was less than or equal to five, and the landing displacements for all the remaining nozzles were not greater than ±20 μm, with no nozzles that caused a landing displacement of greater than ±50 μm B: There were no misfiring nozzles, the number of nozzles that caused a landing displacement of greater than ±20 μm and not greater than ±50 μm was greater than or equal to six, and there were one or more nozzles that caused a landing displacement of greater than ±50 μm C: There were one or more misfiring nozzles Settling Evaluation The amount of the aqueous ink jet ink composition was adjusted such that the total mass of a centrifuge tube, a cap, and the aqueous ink composition was 55 g. The aqueous ink composition was placed in the centrifuge tube, which was then capped. The capped centrifuge tube was placed in a centrifuge (a model CR-20B2 and a ROTOR No. 36, which are products of Hitachi Koki Co., Ltd.), and the process was performed at a rotational speed of 10000 rpm for 15 minutes. Thereafter, the supernatant (region of 5 g from the gas-liquid interface) was collected. Absorbances for 500 nm wavelength light of the supernatant and the aqueous ink jet ink composition prior to centrifugation were measured. The ratio of the absorbance of the aqueous ink jet ink composition to the absorbance of the supernatant was calculated, and evaluations were made according to the following evaluation criteria. Note that there is a positive correlation between the absorbance and the supernatant concentration.

Evaluation Criteria

AA: The supernatant concentration was greater than or equal to 90% of the initial concentration A: The supernatant concentration was 85% or greater and less than 90% of the initial concentration B: The supernatant concentration was less than 85% of the initial concentration Storage Stability The pH of the aqueous ink jet ink composition immediately after preparation and the pH of the aqueous ink jet ink composition after being left for 6 days subsequent to preparation were measured by using a pH meter (a LAQUA F-72, which is a product of Horiba, Ltd.), and evaluations were made according to the following evaluation criteria.

Evaluation Criteria

A: The amount of change in pH was not greater than 0.7

B: The amount of change in pH was greater than 0.7

OD Value

Photographic paper (a product of Seiko Epson Corporation) was used as a recording medium for recording. The ink deposition amount was 11 mg/inch$^2$. The recorded portion was dried, and thereafter the reflection density value (OD value) was measured by using a spectrophotometer (Spectrolino (trade name), which is a product of Gretag-Macbeth Inc.). Based on the measured values, evaluations were made according to the following evaluation criteria.

Evaluation Criteria

AA: The OD value was greater than or equal to 2.8

A: The OD value was 2.5 or greater and less than 2.8

B: The OD value was 1.8 or greater and less than 2.5

Filling Characteristics

A solid image was recorded on photographic paper (a product of Seiko Epson Corporation), which was used as a recording medium. The dot density was 1200×600 dpi, and the mass of the ink droplet was 11 ng. The solid image was recorded on the entire recordable area of the medium. The recorded portion was visually evaluated according to the following evaluation criteria.

Evaluation Criteria

AA: No white streaks due to filling failure were observed

A: Some white streaks due to filling failure were observed

B: Many white streaks due to filling failure were observed

Abrasion Resistance

A sheet of photomat paper manufactured by Seiko Epson Corporation was used for recording, which was performed at a resolution of 1200×600 dpi and under the condition of 10 mg/inch$^2$. Another sheet of the photomat paper was placed on the recorded portion in a manner such that the recorded portion was in contact with the back side of the other sheet of photomat paper. Only one of the sheets of photomat paper was pulled in a lateral direction in a state in which a load of 200 g/cm$^2$ was applied in the placement direction. Subsequently, the recorded portion was evaluated according to the following evaluation criteria.

Evaluation Criteria

A: The color of the image on the recorded portion was not lost, and the color of the image was not transferred to the other sheet of photomat paper B: The color of the image on the recorded portion was at least partially lost, and/or the color of the image was at least partially transferred to the other sheet of photomat paper The results of the examples demonstrate that excellent ejection reliability was achieved in all the examples, in which an aqueous ink including a solvent that contained the specific compound was used for recording by being ejected from an ink jet head including the specific nozzles. In contrast, the results of the comparative examples demonstrate that ejection reliability was inferior in all the comparative examples, in which ink was ejected from nozzles having an S1/S2 ratio of less than 4 or in which aqueous ink that did not contain the specific compound was used for recording by being ejected. Furthermore, the results of the reference examples indicate that when an ink jet head in which nozzles did not have a scalloped shape was used, there was substantially no difference in the evaluation of ejection reliability between the case in which an aqueous ink containing the specific compound was used and the case in which such an aqueous ink was not used. More details are described below. The results of Examples 1 to 3 demonstrate that when nozzles having a large S1/S2 ratio are used, there is a tendency for excellent high-temperature continuous printability to be achieved. The results of Examples 4 to 7 demonstrate that when the content of the specific compound is increased, there is a tendency for excellent ejection reliability to be achieved, and that when the content of the specific compound is reduced, there is a tendency for excellent ink storage stability to be achieved.

The results of Examples 3 and 8 to 20 demonstrate that when the specific compound is a compound in which $R_1$ is a hydrogen atom, a methyl group, or an ethyl group, and $R_2$ is a divalent saturated hydrocarbon group having 5 or fewer carbon atoms or a compound in which $R_1$ is a hydrogen atom, and $R_2$ is a group represented by general formula (2), there is a tendency for even better ejection reliability to be achieved. Furthermore, it is demonstrated that when the specific compound is ethylene glycol, diethylene glycol, propylene glycol, dipropylene glycol, or propylene glycol monomethyl ether, there is a tendency for excellent high-temperature continuous printability to be achieved. The results of Examples 21 to 29 demonstrate that when the penetrating solvent is a 1,2-alkanediol having 6 or more carbon atoms, there is a tendency for filling failure that may occur in recording to be further inhibited. Furthermore, the results of Examples 21 to 29 demonstrate that when the content of the penetrating solvent is increased, there is a tendency for filling failure that may occur in recording to be further inhibited, and that when the content of the penetrating solvent is reduced, there is a tendency for even better high-temperature continuous printability and ink storage stability to be achieved. The results of Examples 21 and 22 demonstrate that when the solvent includes a pyrrolidone-based solvent, there is a tendency for even better high-temperature continuous printability and abrasion resistance to be achieved. The results of Examples 30 to 33 demonstrate that when styrene-acrylic-based resin particles containing, as a constituent component, a methacrylic monomer or an α-methylstyrene monomer are used, even better high-temperature continuous printability and ink storage stability are achieved. Note that although not shown in the tables, it is demonstrated that when styrene-acrylic-based resin particles containing, as constituent components, a methacrylic monomer and an α-methylstyrene monomer are used, even further better high-temperature continuous printability and ink storage stability are achieved. The results of Examples 34 to 37 demonstrate that when the content of the pigment is increased, there is a tendency for excellent color development to be achieved, and that when the content of the pigment is reduced, there is a tendency for excellent intermittent printability to be achieved. The results of Examples 38 to 41 demonstrate that when the volume average particle diameter of the pigment is increased, there is a tendency for excellent high-temperature continuous printability to be achieved, and that when the volume average particle diameter of the pigment is reduced, there is a tendency for excellent pigment non-settling characteristics to be achieved. The results of Examples 42 and 43 demonstrate that when the content of glycerol is reduced, there is a tendency for even better intermittent printability and abrasion resistance to be achieved.

What is claimed is:

1. An aqueous ink jet ink composition for use in an ink jet recording method, the method including ejecting ink from an ink jet head including nozzles, the nozzles being configured such that a shape of a side wall surface is a scalloped shape in which a scallop width S1 and a notch depth S2 satisfy S1/S2≥4,
the aqueous ink jet ink composition comprising a pigment and a solvent that contains a compound represented by general formula (1) below:

$$R_1\text{—}O\text{—}R_2\text{—}OH \quad (1)$$

where $R_1$ represents a hydrogen atom, a methyl group, or an ethyl group, and $R_2$ represents a divalent saturated hydrocarbon group having 5 or fewer carbon atoms or a group represented by general formula (2) below:

$$R_3\text{—}O\text{—}R_4 \quad (2)$$

where $R_3$ and $R_4$ each independently represent a divalent saturated hydrocarbon group having 2 or 3 carbon atoms.

2. The aqueous ink jet ink composition according to claim 1, wherein a content of the compound represented by general formula (1) is from 2 to 16 mass % relative to a total amount of the aqueous ink jet ink composition.

3. The aqueous ink jet ink composition according to claim 1, wherein the compound represented by general formula (1) is at least one selected from the group consisting of ethylene glycol, diethylene glycol, propylene glycol, dipropylene glycol, and propylene glycol monomethyl ether.

4. The aqueous ink jet ink composition according to claim 1, wherein the solvent includes a penetrating solvent, and the penetrating solvent is at least one selected from the group consisting of 1,2-alkanediols having 6 or more carbon atoms and alkylene glycol monobutyl ethers.

5. The aqueous ink jet ink composition according to claim 4, wherein a content of the penetrating solvent is from 2.0 to 8.0 mass % relative to a total amount of the aqueous ink jet ink composition.

6. The aqueous ink jet ink composition according to claim 4, wherein a mass ratio of the content of the penetrating solvent to a content of the compound represented by general formula (1) is from 0.1 to 1.0.

7. The aqueous ink jet ink composition according to claim 1, further comprising resin particles.

8. The aqueous ink jet ink composition according to claim 7, wherein the resin particles are styrene-acrylic-based resin particles containing a methacrylic monomer as a constituent component.

9. The aqueous ink jet ink composition according to claim 7, wherein the resin particles are styrene-acrylic-based resin particles containing an α-methylstyrene monomer as a constituent component.

10. The aqueous ink jet ink composition according to claim 1, wherein the solvent further includes glycerol, and a content of the glycerol is less than or equal to 10 mass % relative to a total amount of the aqueous ink jet ink composition.

11. The aqueous ink jet ink composition according to claim 1, wherein a content of the pigment is from 0.5 to 10 mass % relative to a total amount of the aqueous ink jet ink composition.

12. The aqueous ink jet ink composition according to claim 1, wherein the solvent includes a pyrrolidone-based solvent.

13. The aqueous ink jet ink composition according to claim 1, wherein the pigment has a volume average particle diameter of from 50 to 150 nm.

14. The aqueous ink jet ink composition according to claim 1, wherein the nozzles are nozzles formed by performing an etching process and an etching side wall protection process alternately and repeatedly several times.

15. An ink jet recording method comprising an ejection step of ejecting the aqueous ink jet ink composition according to claim 1 from an ink jet head,
wherein the ink jet head includes nozzles, and the nozzles are configured such that a shape of a side wall surface is a scalloped shape in which a scallop width S1 and a notch depth S2 satisfy S1/S2≥4.

* * * * *